(12) United States Patent
Chen et al.

(10) Patent No.: US 10,236,538 B2
(45) Date of Patent: Mar. 19, 2019

(54) INTELLIGENT BATTERY MANAGEMENT SYSTEM AND METHOD FOR OPTIMIZING BATTERY SET TO THE BEST PERFORMANCE

(71) Applicants: Laurence Lujun Chen, Hayward, CA (US); Di (Laura) Chen, Xi'an (CN); Michael Meng Chen, Hayward, CA (US)

(72) Inventors: Laurence Lujun Chen, Hayward, CA (US); Di (Laura) Chen, Xi'an (CN); Michael Meng Chen, Hayward, CA (US)

( * ) Notice: Subject to any disclaimer, the term of this patent is extended or adjusted under 35 U.S.C. 154(b) by 588 days.

(21) Appl. No.: 13/844,978

(22) Filed: May 31, 2013

(65) Prior Publication Data

US 2014/0356656 A1 Dec. 4, 2014

(51) Int. Cl.
| | |
|---|---|
| *H01M 10/42* | (2006.01) |
| *H01M 10/44* | (2006.01) |
| *H01M 10/48* | (2006.01) |
| *H01M 10/6556* | (2014.01) |
| *H01M 10/617* | (2014.01) |
| *H01M 10/6561* | (2014.01) |
| *H02J 7/00* | (2006.01) |

(52) U.S. Cl.
CPC ....... *H01M 10/425* (2013.01); *H01M 10/441* (2013.01); *H01M 10/482* (2013.01); *H01M 10/617* (2015.04); *H01M 10/6556* (2015.04); *H01M 10/6561* (2015.04); *H02J 7/0013* (2013.01); *H01M 2010/4271* (2013.01); *H02J 7/0021* (2013.01); *H02J 7/0024* (2013.01); *Y02T 10/7055* (2013.01)

(58) Field of Classification Search
CPC .... H01M 10/42; H01M 10/052; H01M 2/206; G01R 31/3606
USPC ................................ 320/118, 120, 126, 134
See application file for complete search history.

(56) References Cited

U.S. PATENT DOCUMENTS

| | | | | |
|---|---|---|---|---|
| 7,859,223 B2 * | 12/2010 | Gorbold | ............. | G01R 31/3658 320/116 |
| 8,089,249 B2 * | 1/2012 | Zhang | ................... | H02J 7/0016 320/116 |
| 8,134,340 B2 * | 3/2012 | Park | ........................ | H01M 4/42 320/134 |
| 8,173,285 B2 * | 5/2012 | Dougherty | .......... | H01M 2/1077 320/152 |
| 8,258,754 B2 * | 9/2012 | Chen | ........................ | H02J 1/14 320/136 |

(Continued)

FOREIGN PATENT DOCUMENTS

WO    WO2013143754    *  3/2013    ............ H01M 10/42

OTHER PUBLICATIONS

Claim Drafing Advanced and Beginning Claim Drafting.*

*Primary Examiner* — Nina Bhat

(57) ABSTRACT

The battery management system can automatically re-combine batteries in a battery set in parallel connection or in series connection or in mixed series-parallel connection, or mixed parallel-series connection, and makes each individual cell in a battery being accessible, such that each individual cell can be monitored (i.e. its parameters can be measured) and charged or discharged. Therefore, with this system, batteries can be charged or discharged to their best performance.

3 Claims, 16 Drawing Sheets

(56) References Cited

U.S. PATENT DOCUMENTS

| | | | | |
|---|---|---|---|---|
| 8,271,054 B2* | 9/2012 | Bockus | ............ | H04W 52/0258 |
| | | | | 320/106 |
| 8,273,474 B2* | 9/2012 | Al-Hallaj | .......... | H01M 10/4207 |
| | | | | 429/120 |
| 8,310,177 B2* | 11/2012 | Naumann | ................. | B25F 5/00 |
| | | | | 318/105 |
| 8,344,694 B2* | 1/2013 | Zhang | ................... | H01M 10/42 |
| | | | | 320/118 |
| 8,655,553 B2* | 2/2014 | Nojima | ............... | B60L 11/1846 |
| | | | | 180/165 |
| 2011/0313613 A1* | 12/2011 | Kawahara | ........... | H01M 10/441 |
| | | | | 701/34.4 |
| 2012/0326531 A1* | 12/2012 | Kawamoto | ........... | H02J 7/0031 |
| | | | | 307/130 |
| 2013/0158755 A1* | 6/2013 | Tang | .................... | H01M 10/48 |
| | | | | 701/22 |
| 2013/0234669 A1* | 9/2013 | Huang | ..................... | H02J 7/34 |
| | | | | 320/126 |

* cited by examiner

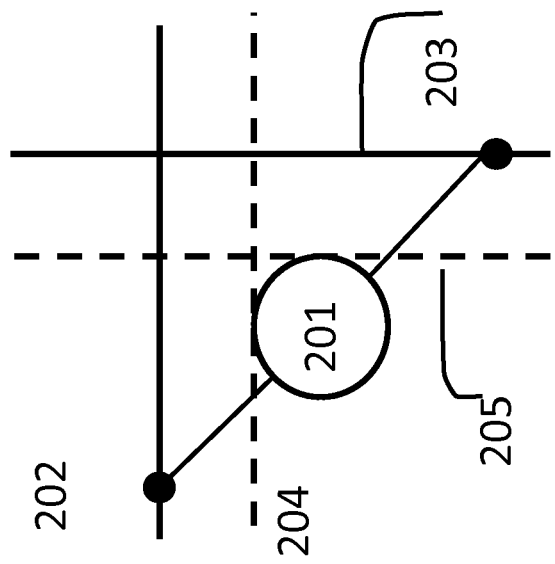

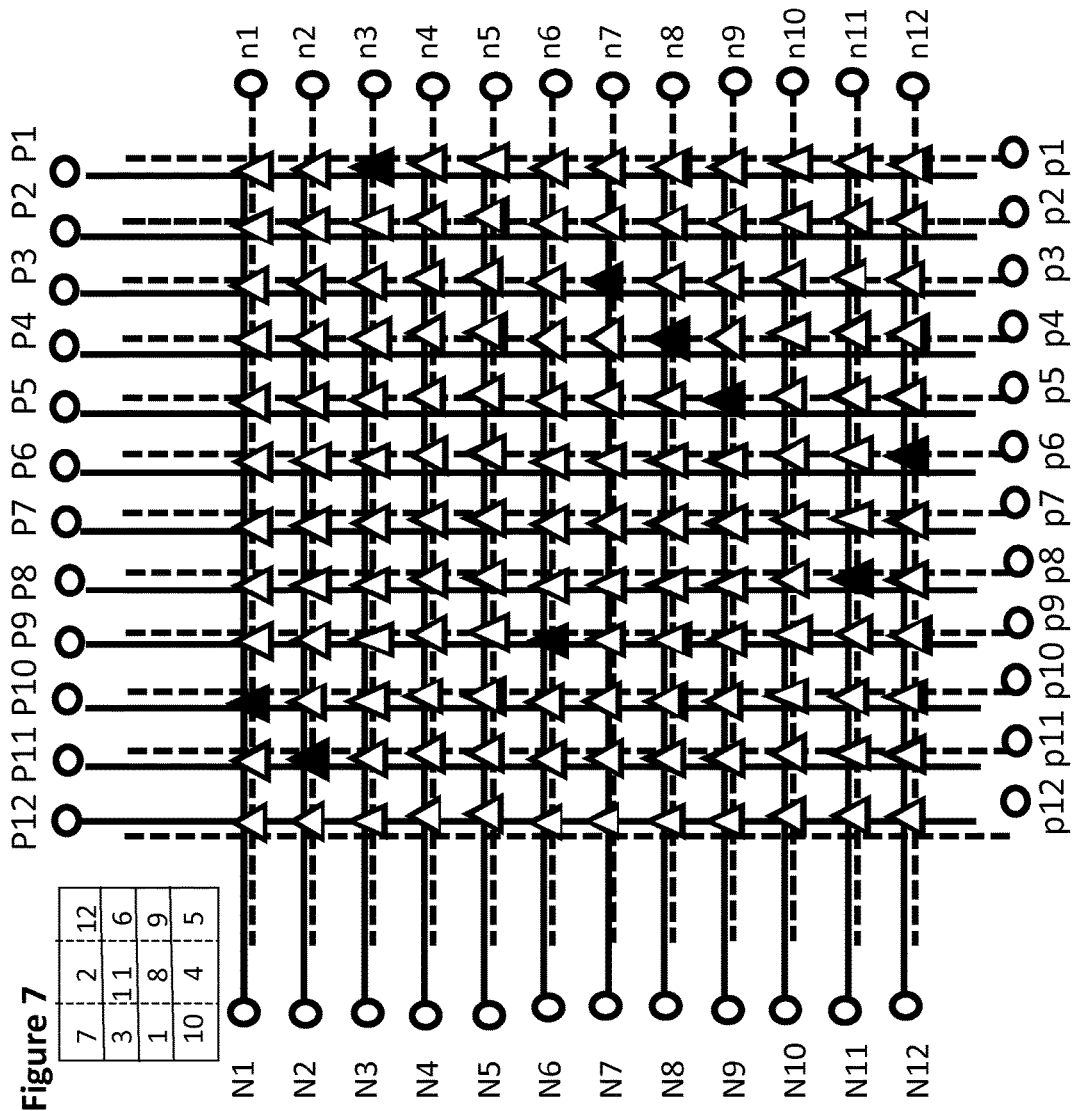

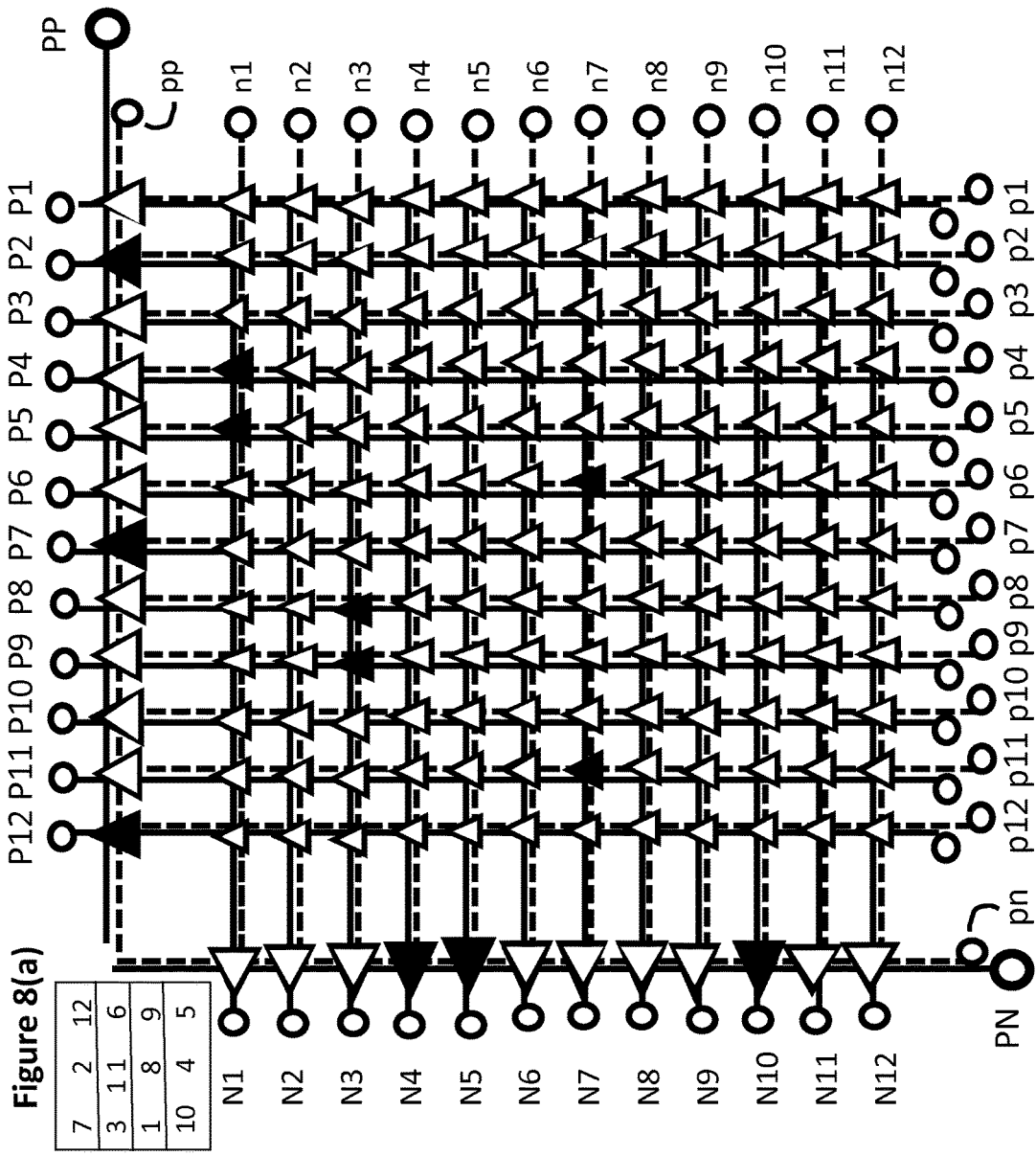

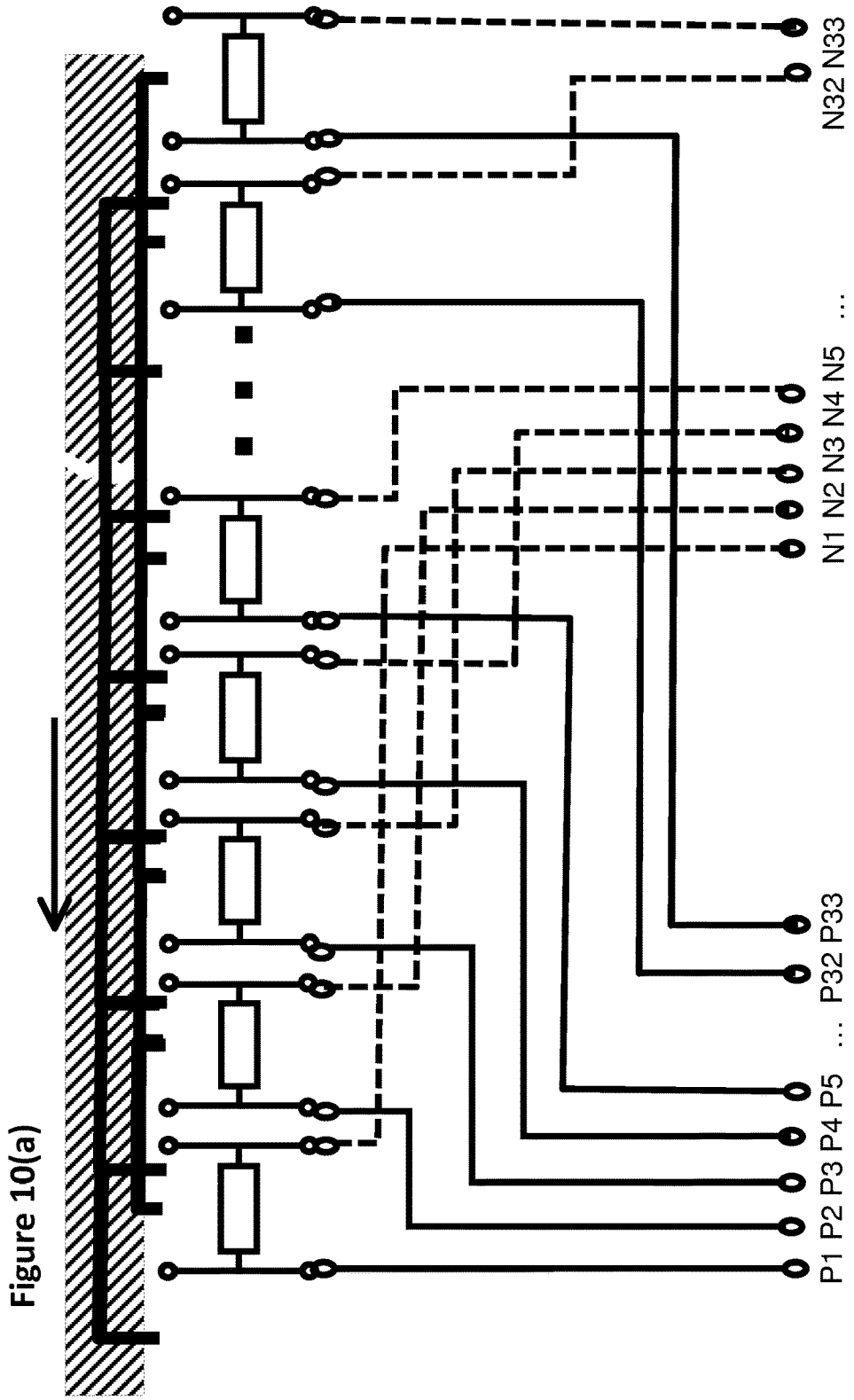

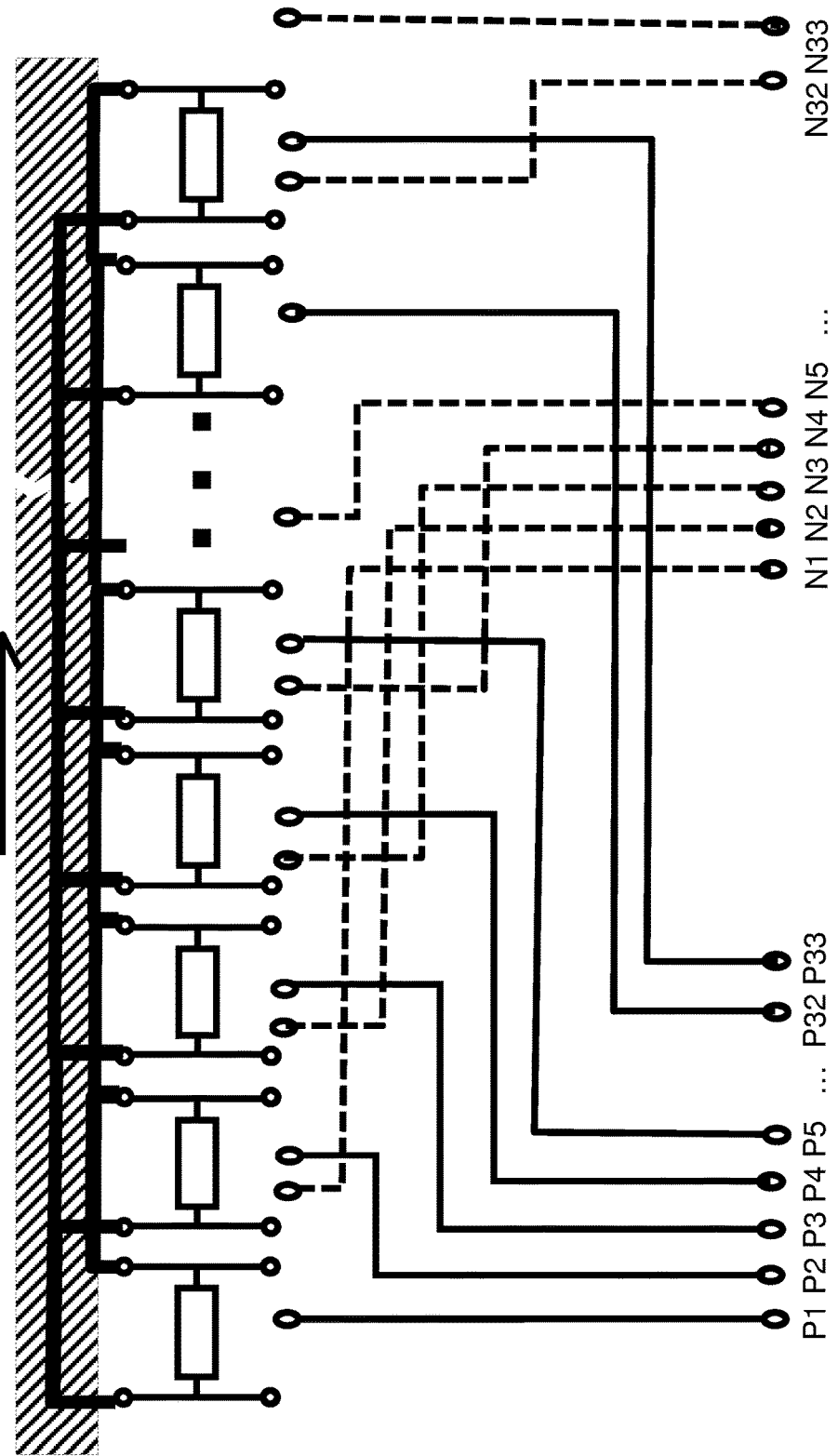

INTELLIGENT BATTERY MANAGEMENT SYSTEM AND METHOD FOR OPTIMIZING BATTERY SET TO THE BEST PERFORMANCE

FIELD OF INVENTION

An intelligent battery management system and method, cutting-in at a new angle, optimizes rechargeable battery set to the best performance, which can overcome the backwards of all current management systems and methods, and reduce the manufacturing cost at better performances. The management system is supported by a cutting-edge method and corresponding embodiment, which can automatically re-combine batteries in a battery set in parallel connection or in series connection or in mixed series-parallel connection, or mixed parallel-series connection, each individual cell in a battery set can accessed, which means each individual cell can be monitored (i.e. its parameters can be measured) and charged or discharged. With this system, batteries can be charged or discharged to their best performance.

BACKGROUND OF INVENTION

Battery management system (BMS) is an important part of the Electric Vehicle (EV). It protects the battery system from damage, predicts and increases battery life, and maintains the battery system in an accurate and reliable operational condition. The BMS performs several tasks such as measuring the system voltage, current and temperature, the cells state of charge (SoC), state of health (SoH), and remaining useful life (RUL) determination, protecting the cells, thermal management, controlling the charge/discharge procedure, data acquisition, communication with on-board and off-board modules, monitoring and storing historical data and the most important task is the cell balancing. Imbalance of cells in battery systems is very important matter in the battery system life. Because without the balancing system, the individual cell voltages will drift apart over time. The capacity of the total pack will also decrease more quickly during operation' then fail the battery system. As mentioned in cited references below, currently, the most common methods of battery management are based on passive and active cell balance or equalization (such as bypass circuits and potential conversion), using series connection or using daisy chain connection, and the connections of batteries for all the cases cited are fixed at initial of manufacture. However, none of these methods cannot access individual battery subset or single battery for measuring, monitoring and balancing, and compensation. For example, the battery management units of Kawahara et al (US 2011/0313613), Nojima et al (U.S. Pat. No. 8,655,553 B2), Gorbold et al (U.S. Pat. No. 7,859,223 B2), Poehler et al (WO 2013143754) and all other cited inventors cannot achieve this "arbitrary and automatic connection". Here a brief comparison is given in batble below (numbers in [xxx] are paragraph numbers in cited prior arts, such as [K0088] is for paragraph 0088 in Kawahara's):

| Catalogs | Prior Arts | This Invention |
| --- | --- | --- |
| Functions to be achieved | Charging, discharging and monitoring batteries, thermal management | Same as left |
| System components | Batteries, cell control unit, battery management unit, charger, inverter, Voltage meter and SOC detector [Kawahara FIGS. 1, 2] Power supply, DPS, monitoring component, storage component, user interface [Nojima FIG. 1] battery cells 10, 12, 14, 16, 18, monitoring device, 30, 32, 34,3 6, 38, and controller 70 [Gorbold FIG. 1; Poehler FIG. 2] | Batteries, connection controller, system controller, charger, load & serve pack, monitoring meters, hole-net thermal bed |
| System constructions | Kawahara FIGS. 1, 2; Gorbold FIG. 1; Nojima FIG. 1; Poehler FIG. 2. | Construction in FIG 1 is obviously and completely different form the 3 prior arts |
| Battery connection | "two battery modules 112 a, 112 b in series, each battery module including four batteries 111 electrically connected in series . . . , actually, approximately 100 to approximately 200 batteries 111 are mounted and electrically connected in series or in series and parallel" [K0088]--- these connections are fixed at initial of building, and cannot be changed during operation. Number of cells in in series and parallel connection cannot be arbitrarily given. "As can be seen from FIG. 1, the battery monitors are arranged in a daisy chain." [G005] (i.e. Gorbold: BRIEF DESCRIPTION paragraph 005); "This loop connection may be referred to as the "daisy chain connection" "[K0097] | By using invented connection controller, batteries can automatically re-combined in any kinds of (i.e. arbitrarily given number of cells) parallel or any kinds of series or any kinds of mixed series-parallel connection, during operation "daisy chain" is not used in this invention |
| Operation control | The cell control unit 120 includes a plurality of battery management units [K0091-K0094] | Only one connection controller controlled by microprocessor (or computer) |
| Driver circuits | Circuit of control unit consists of daisy chain us shown in Kawahara FIG. 3 and Gorbold FIG. 1 | connection controller circuit consists of switch matrix as shown in FIG 3 and FIG 8(a) |

-continued

| Catalogs | Prior Arts | This Invention |
| --- | --- | --- |
| Components sharing | ". . . groups of cells 10, 12, 14, 16, 18 and 20 respectively . . . Each group of cells is associated with a respective battery monitoring device, 20, 32, 34, 36, 38, and 40" [G001]; " . . . battery management units 121 a,121 b . . ." [K0094 - 0094, K0097, K01060, K0107]. --- means all of them need multiple individual monitoring devices | Only one shared monitoring device for all battery cells or subsets by using connection controller to choose individual cell or subset |
| Number of Sensors | "A plurality of temperature sensors (not illustrated) for detecting the temperature of the battery pack is installed" [K0090] | Only need one at center or two sensors at center and outside because hole-new thermal bed makes the temperature almost uniform and don't need more. |
| potential conversion | "In this embodiment, the potential conversion (level shifting) is performed on the input side of the signal input/output circuits" [K0106] | No need of "potential conversion" |
| bypass circuit | "For this reason, each of the battery management units 121 a, 121 b includes a bypass circuit electrically connected in parallel between the respective terminals of the batteries 111 constituting the corresponding battery modules 112 a, 112b" [K0107] | No need of "bypass circuit" |

More comparisons will be described in paragraph [20] in section of "Detail Description of the Invention".

SUMMARY OF THE INVENTION

An intelligent battery management system and method, cutting-in at a new angle, optimizes rechargeable battery set to the best performance, which can overcome the backwards of all current management systems and methods, and reduce the manufacturing cost at better performances. The management system is supported by a cutting-edge method and corresponding embodiments, which can automatically re-combine batteries in a battery set in parallel connection or in series connection or in mixed series-parallel connection, or mixed parallel-series connection, each individual cell in a battery set can accessed, which means each individual cell can be monitored (i.e. its parameters can be measured) and charged or discharged. With this system, batteries can be charged or discharged to their best performance. Besides battery set, the system comprises connection controller [the combined connection controller, or parallel connection controller and series connection controller], micro-processor/controller, meters for battery measurement and monitoring, charger, load serve pack (electrical and mechanical), and thermal management apparatus.

DETAIL DESCRIPTION OF THE INVENTION

Brief Description of the Drawings

FIG. 4—Details at the cross of control lines with switch unit.
FIG. 7—Example of achieving parallel connection by separated connection controllers.
FIG. 8(a)—Second example of achieving both parallel and series connections by second type of combined connection controller, the configuration in FIG. 8(a) can be used as combined connection controller, or as a part of separated connection controllers.
FIG. 10(a)—Example of selection clickers used to switch between "measurement" and "application" (including loading and recharging) for parallel connection of batteries in battery subset, now it is at "measurement" status.
FIG. 10(b)—Example of selection clickers used to switch between "measurement" and "application" (including loading and recharging) for parallel connection of batteries in battery subset, now it is at "application" status.

SYSTEM CONFIGURATION

Figure 1A:
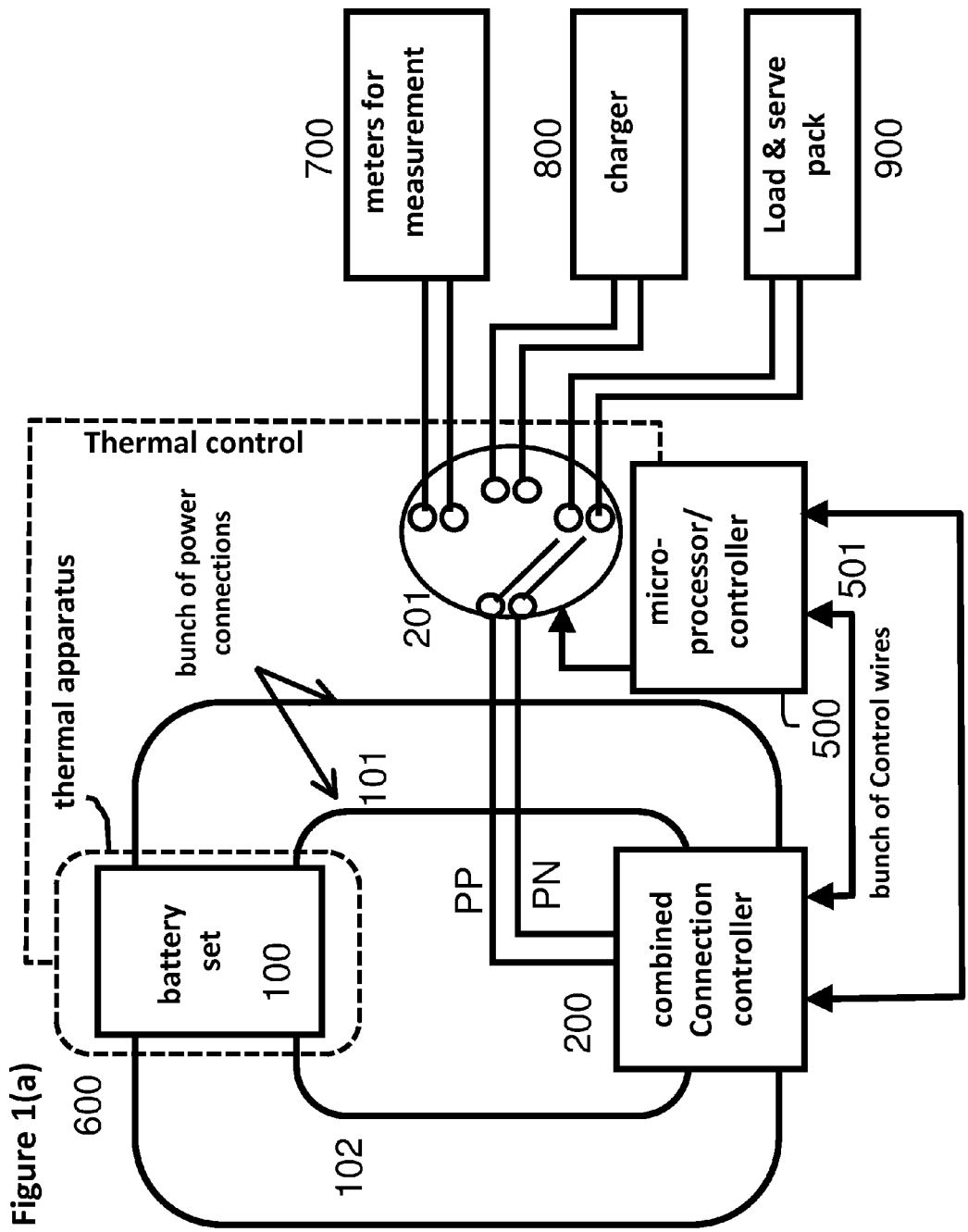
FIG. 1(a)—System Configuration.
Figure 1B:
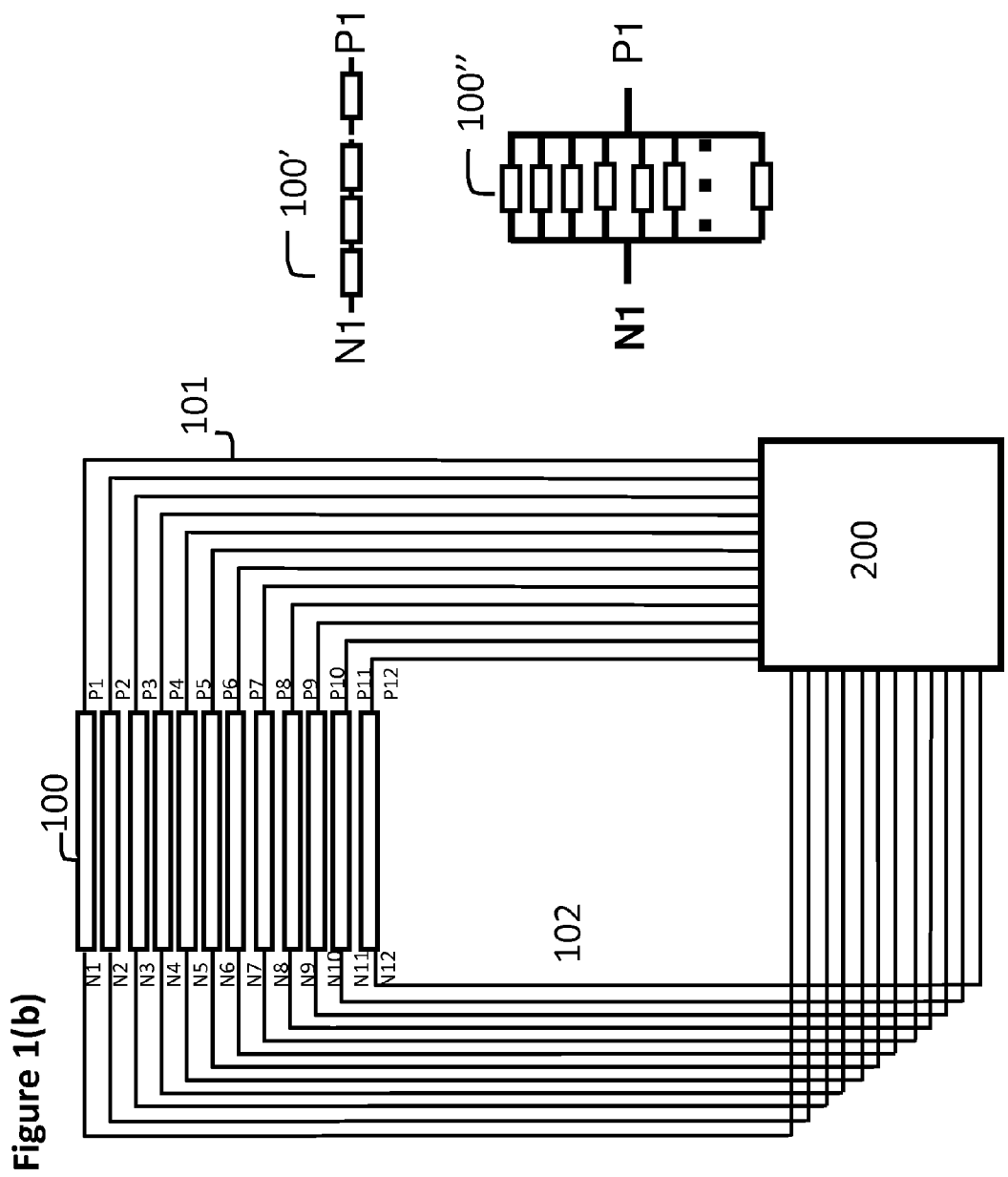
FIG. 1(b)—details of battery connection with controller.
Figure 2A:
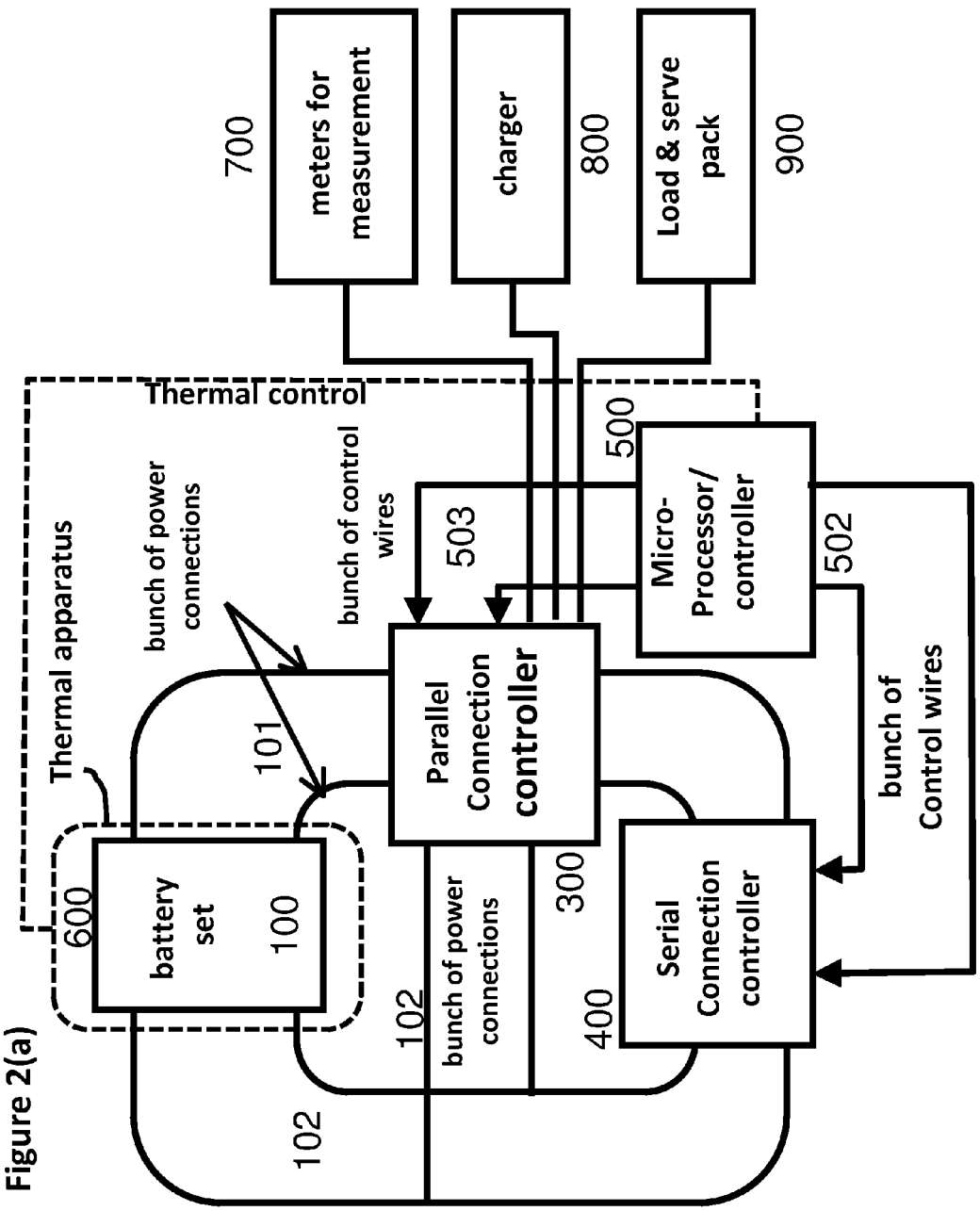
FIG. 2(a)—Second option of system Configuration.

The system comprises battery set 100, connection controller [i.e. the combined connection controller 200, or parallel connection controller 300 and series connection controller 400, as show in FIGS. 1(a) and 2(a), respectively], micro-processor or controller 500, meters for battery measurement and monitoring 700, charger 800, load serve pack (electrical and mechanical) 900, and thermal management apparatus 600. In battery set 100, each unit can be a single battery, or can be a battery sub-set [like 100' or 100" as shown in FIGS. 1(*b*) and 2(*b*)], which is consist of multiple single batteries in series connection 100', or in parallel connection 100".

<Apparatus Embodiments and Methods for Arbitrarily Controlling Battery Connection>

Battery connection controller is the apparatus embodiments for arbitrarily controlling battery connection. In FIGS. 1(*b*) and 2(*b*) are shown two examples of battery connection controllers, with 2×12 power lines for 12 batteries or battery sub-sets (here 12 just for example, actually, lines can be 2, 3, 4, . . . and up to 10,000), the lines connected to negative pole are denoted by N1, N2, N3, . . . and the lines connected to positive pole are denoted by P1, P2, P3, . . . .

I. Combined Connection Controller

Figure 5A:
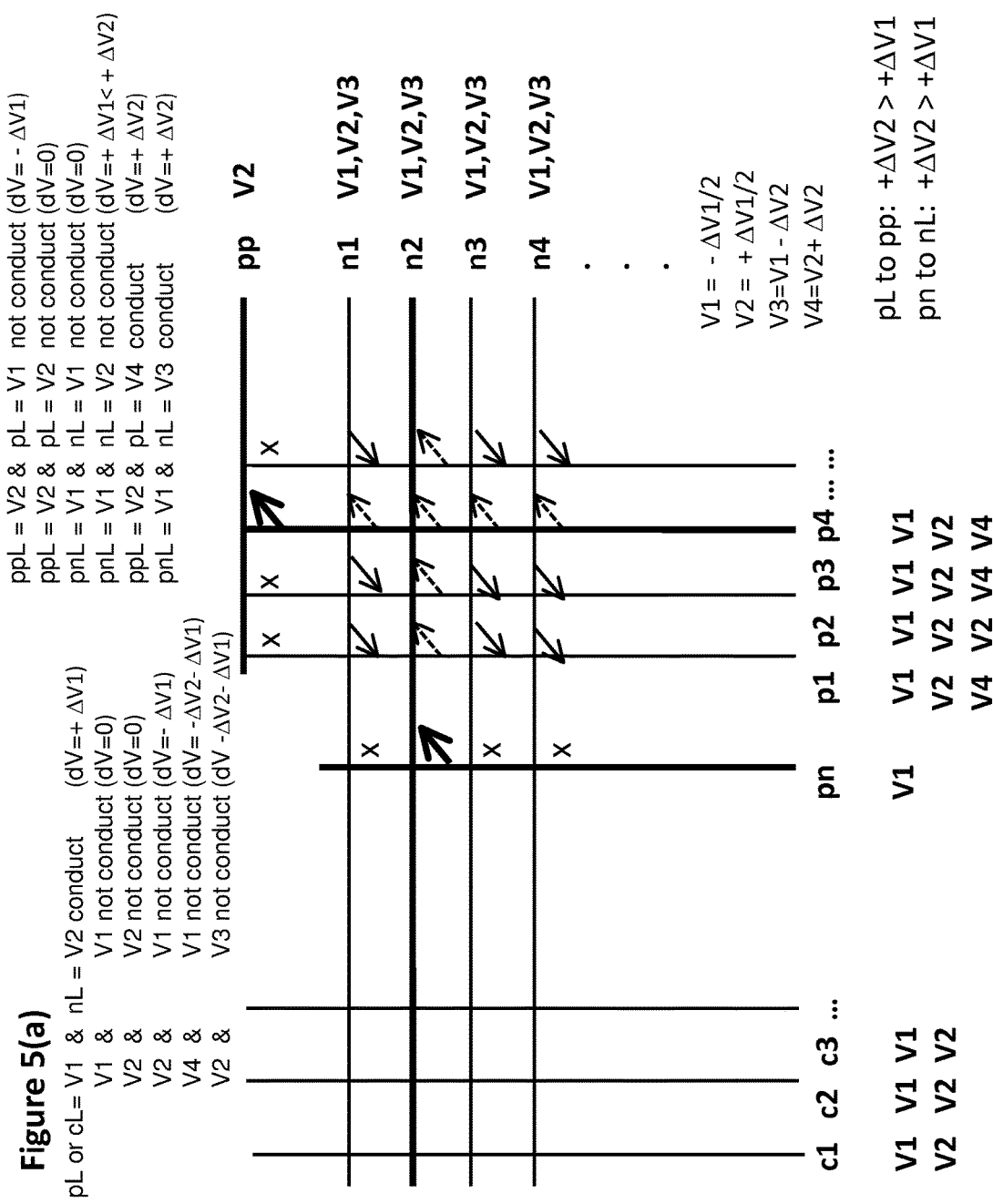
FIG. 5(a)—Switch condition diagram.

Connection controller is one of the key elements of this invention. In FIGS. 3 to 8 show details of combined connection controllers and separated connection controllers. The solid lines show the power lines [P1, P2, P3, . . . N1, N2, N3, . . . , PN, PP, C1, C2, C3, . . . ], and the dash lines show switch control lines [p1, p2, p3, . . . , n1, n2, n3, . . . , pn, pp, c1, c2, c3, c4, . . . ] which conduct the switch signal from micro-processer or controller 500. The cross of any two solid lines does not mean a connect of the two solid lines unless corresponding cross of dash lines [the zoom-in is shown in FIG. 4] satisfy certain conditions which is shown in FIG. 5. At the cross of two solid lines, there is a corresponding cross of two dash lines and a switch. The status [open or close] of switch determines the connection [not connected or connected, respectively] of two crossed solid lines, while the voltage difference of two crossed dash lines determines the status of switch. Control lines [pp, pn] are for connection control of power assembly poles (most outside layer, in parallel), and control lines [p1, p2, p3, . . . ] and lines [n1, n2, n3, . . . ] are for series connection control of inside layers, and control lines [c1, c2, c3, . . . ] (associated with [n1, n2, n3, . . . ]) are for parallel connection control of inside layers. Power lines [P1, P2, P3, . . . ] are connected to positive pole of battery or battery sub-sets, power lines [N1, N2, N3, . . . ] are connected to negative pole of battery or battery sub-sets. Power lines [PP, PN] are the assembly positive and negative power poles of the whole battery set, respectively. Bridge power lines [C1, C2, C3, . . . ] (and their control lines [c1, c2, c3, . . . ] also) are for the internally parallel connection, and they can be either crossed with negative power lines [N1, N2, N3, . . . ] (and with control lines [n1, n2, n3, . . . ] correspondingly) as shown in FIGS. 3, 5, 6, 8, or crossed with positive power lines [P1, P2, P3, . . . ] (and with control lines [p1, p2, p3, . . . ] correspondingly) which is not shown in Figures. The circles at end of dash lines indicate the sockets for the connection (when be plugged) to switch controller, i.e. microprocessor and the circles at end of solid lines indicate the sockets for the connection (when be plugged) to positive and negative poles of batteries/subsets.

Let's assume there are total Nb battery units, Nset battery subsets, and there are Nsb battery units in each subset, so Nset×Nsb=Nb, we need further to group these Nset battery subset into Ns rows in series connection, Np battery units inside each row in parallel connection, or to group these Nset battery subset into Np columns in parallel connection, Ns battery units inside each column in series connection, so Ns×Np=Nset, and Nsb×Ns×Np=Nb. Each battery unit is single battery along, or a single battery with balance/compensation device together. For example, Tesla RoadStar has 6831 battery, 69 cells are wired in parallel to create a brick, 9 (i.e. 3×3) bricks are connected in series to create sheets, and 11 sheets are inserted in series into the pack casing, in total, this creates a pack made up of 6,831 cells, which means Nsb=1, Np=69, and Ns=99 (3×3×11).

Figure 3:
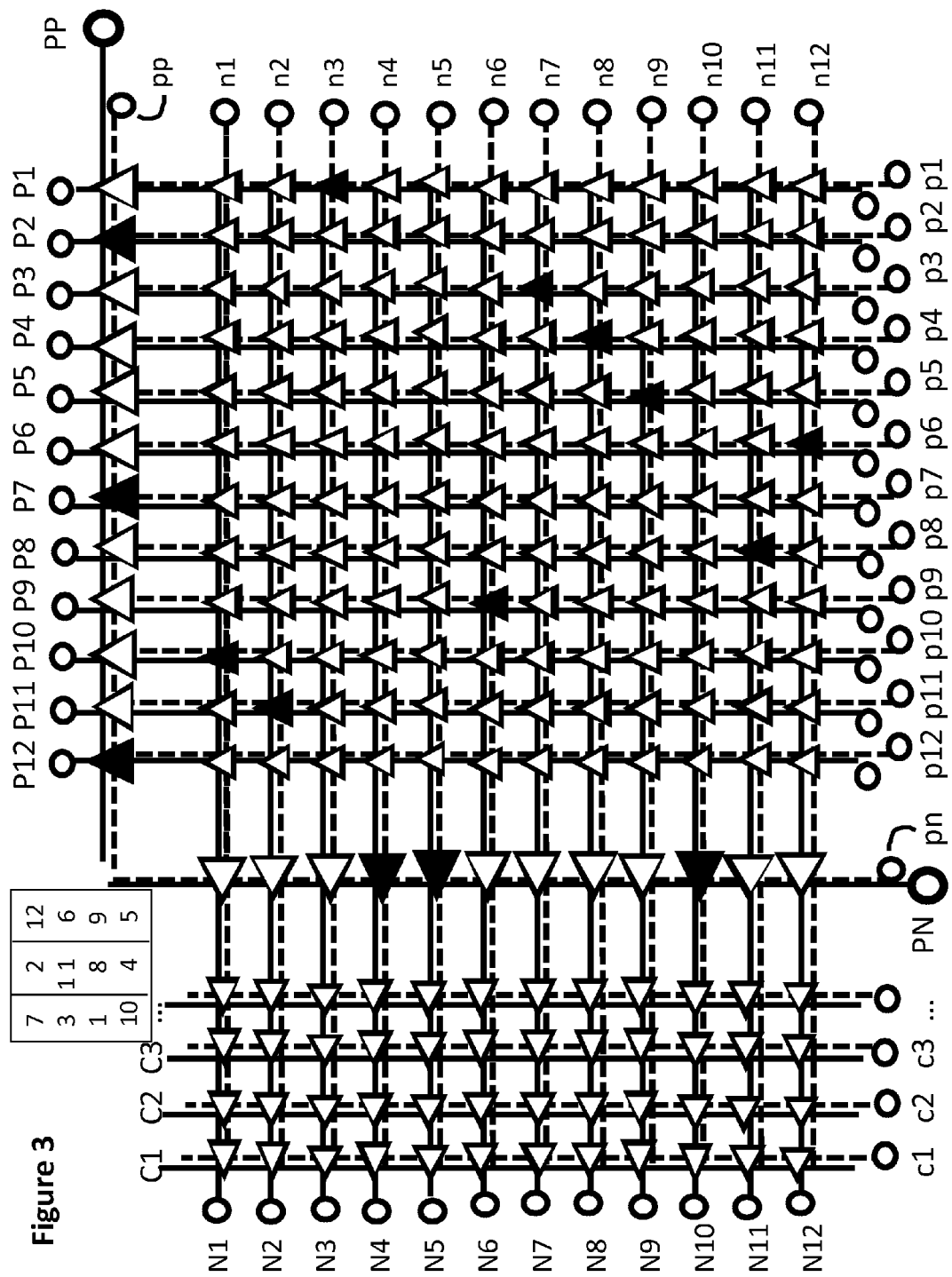
FIG. 3—Example of achieving series connection by combined connection controllers.

In FIG. 3 is shown an example of combined connection controller for series connection application using Nset=12 battery units (batteries or battery subsets). The connection controller divides 12 units into CASE I: 3 groups [7 3 1 10], [2 11 8 4] and [12 6 9 5], and connect 4 units in each group in series, then connect the 3 groups in parallel; or into CASE II: 4 groups [7 2 12], [3 11 6], [1 8 9], and [10 4 5], and connect 3 units in each group in parallel, then connect the 4 groups in series. And for each of the two cases, there are 12!=479,001,600 permutations or combinations, Here are other 4 examples from said 479,001,600 permutations: "[1 2 3 4], [5 6 7 8], [9 10 11 12]", "[1 3 4 5], [6 7 8 9], [10 11 12 2]", "[1 4 5 6], [7 8 9 10], [11 12 3 4]", "[1 4 5 6], [7 8 9 10], [11 12 4 3]", . . . and so on (even through a person skilled in the art can completely understand this function or feature without this detail explanation and these examples). The white triangle in all relevant figures mean the switch is off (disconnected), and the black triangle means the switch is on (connected). Note that the configuration shown in FIG. 8 is same as the right part of the configuration in FIG. 3, i.e. no C1, C2, C3 . . . in FIG. 8 (see below), actually, C1, C2, C3 . . . are not used in FIG. 3 for series connection, so same series connection can be also achieved by the configuration shown in FIG. 8.

Figure 6:
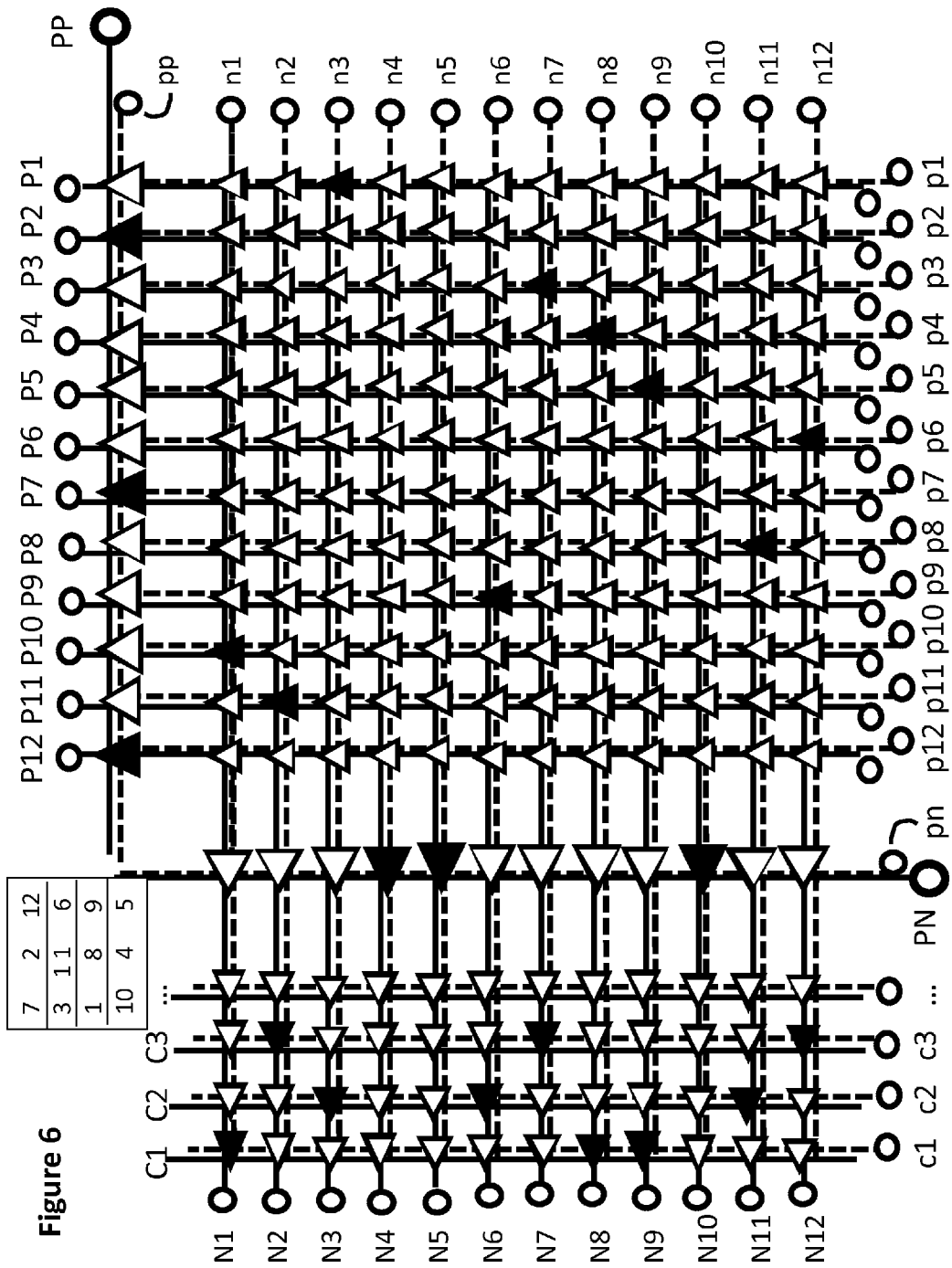
FIG. 6—Example of achieving parallel connection by combined connection controllers.

In FIG. 6 is shown example of combined connection controller for parallel connection application using Nset=12 battery units or subsets. The combined connection controller divides 12 units into 4 groups [7 2 12], [3 11 6], [1 8 9], and [10 4 5], and connect 3 units in each group in parallel, then connect the 4 groups in series. Another example of parallel connection can be also achieved by the configuration shown in FIG. 8.

Let's give more description on FIGS. 4 and 5, so as to have better understand how switch control works, and further to understand how connection controller shown in FIGS. 3 and 6 works. For the combined connection controller, two kinds of switch are needed, with $\Delta V1$ and $\Delta V2$ ($\Delta V2 \geq \Delta V1$, including the case $\Delta V2=\Delta V1$) as their switch voltages respectively. For better operation, difference ($\Delta V2-\Delta V1$) should not too large comparing with $\Delta V1$, say within $\Delta V1$, i.e. ($\Delta V2-\Delta V1$)<$\Delta V1$. The switch can be a mechanic type, or an electrical type, but for the connection in outside layer, switch with higher power is needed. Therefore, 4 control voltage levels V1, V2, V3 and V4 (as shown in FIG. 5(*a*)) or 5 level voltage levels V0, V1, V2, V3 and V4 (as shown in FIG. 5(*b*)) are needed to perform the switching control. In these figures, all p-lines (i.e. p1, p2, p3, . . . ) are denoted as pL; all c-lines (i.e. c1, c2, c3, . . . ) are denoted as cL, all n-lines (i.e. n1, n2, n3, . . . ) are denoted as nL, and ppL means pp line, pnL means pn line.

For 4 level control voltages (in FIG. 5(*a*)), all nL have three level voltages V1, V2 and V3; all pL have three level voltages V1, V2 and V4; all cL have two level V1 and V2, ppL always stays at V2; pnL always stays at V1, where $V1=-\Delta V1/2$, $V2=+\Delta V1/2$, $V3=V1-\Delta V2$, $V4=V2+\Delta V2$, here is logical table for switch control:

pL or cL=V1 & nL=V2 conduct (dV=+$\Delta V1$)
pL or cL=V1 & nL=V1 not conduct (dV=0)
pL or cL=V2 & nL=V2 not conduct (dV=0)
pL or cL=V2 & nL=V1 not conduct (dV=-$\Delta V1$)
pL or cL=V4 & nL=V1 not conduct (dV=-$\Delta V2-\Delta V1$)
pL or cL=V2 & nL=V3 not conduct (dV=-$\Delta V2-\Delta V1$)

ppL=V2 & pL=V1 not conduct (dV=−ΔV1)
ppL=V2 & pL=V2 not conduct (dV=0)
pnL=V1 & nL=V1 not conduct (dV=0)
pnL=V1 & nL=V2 not conduct (dV=+ΔV1<+ΔV2)
ppL=V2 & pL=V4 conduct (dV=+ΔV2)
pnL=V1 & nL=V3 conduct (dV=+ΔV2)

Figure 5B:
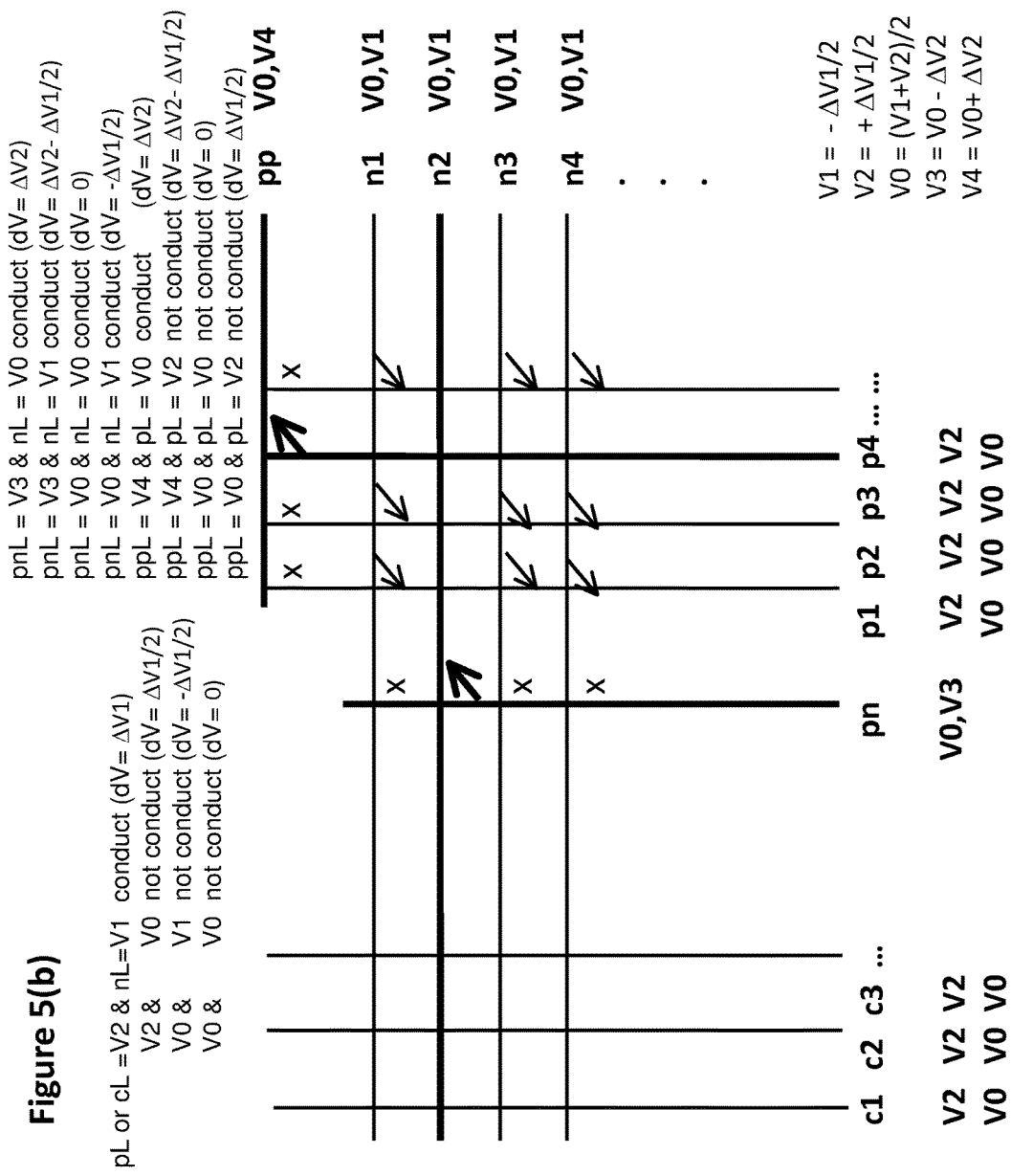
FIG. 5(b)—Second option of switch condition diagram.

For 5 level control voltages (in FIG. 5(b)), all nL have two level voltages V0 and V1; all pL and cL have two level V0 and V2, ppL has two level V0 and V4; pnL has two levels V0 and V3. The default control voltage of all switch control lines are set at V0, voltages V1 and V2 are used for inside layer (series and parallel) connection control; V3 and V4 (associate with V1 and V2) are used for connection control of power assembly poles (most outside layer, in parallel), where V1=−ΔV1/2, V2=+ΔV1/2, V3=V0−ΔV2, V4=V0+ΔV2, here is logical table for switch control:

pL or cL=V2 & nL=V1 conduct (dV=ΔV1)
pL or cL=V2 & nL=V0 not conduct (dV=ΔV1/2)
pL or cL=V0 & nL=V1 not conduct (dV=−ΔV1/2)
pL or cL V0 & nL=V0 not conduct (dV=0)
pnL=V3 & nL=V0 conduct (dV=ΔV2)
pnL=V3 & nL=V1 conduct (dV=ΔV2−ΔV1/2)
pnL=V0 & nL=V0 conduct (dV=0)
pnL=V0 & nL=V1 conduct (dV=−ΔV1/2)
ppL=V4 & pL=V0 conduct (dV=ΔV2)
ppL=V4 & pL=V2 not conduct (dV=ΔV2−ΔV1/2)
ppL=V0 & pL=V0 not conduct (dV=0)
ppL=V0 & pL=V2 not conduct (dV=ΔV1/2)

II. Separate Connection Controllers

Unlike the combined connection controller 200, parallel connection controller 300 and series connection controller 400 can be built separately, as shown in FIG. 2(a), so called separate connection controllers, their detail layouts are shown in FIGS. 8 and 7, respectively. In this case, we only need two control voltage levels for each of them. In FIG. 7 is shown an example of using series connection controller (rather than combined connection controller in FIG. 3) for the part of series connection in same application as shown in FIG. 3 and FIGS. 8 (a) and 8(b) are shown two examples of using parallel connection controller (rather than combined connection controller in FIG. 6) for part of parallel connection in the same application as shown in FIG. 6.

The circuit configuration in FIG. 7 only does all series connections within each of the 3 groups, but not do parallel connection for the three groups yet. The switches on pp and pn control lines in FIG. 8 (a, b) will take care of the parallel connection, i.e. connecting the positive poles or terminates of units 7, 2 and 12 to power output line PP and connecting negative poles or terminates of units 10, 4 and 5 to power output line PN. All the switches at crosses of nL (i.e. n1, n2, n3, . . . ) and pL (i.e. p1, p2, p3, . . . ) are never used. So the circuit is redundant if only for series connection application in FIG. 3.

Figure 8B:
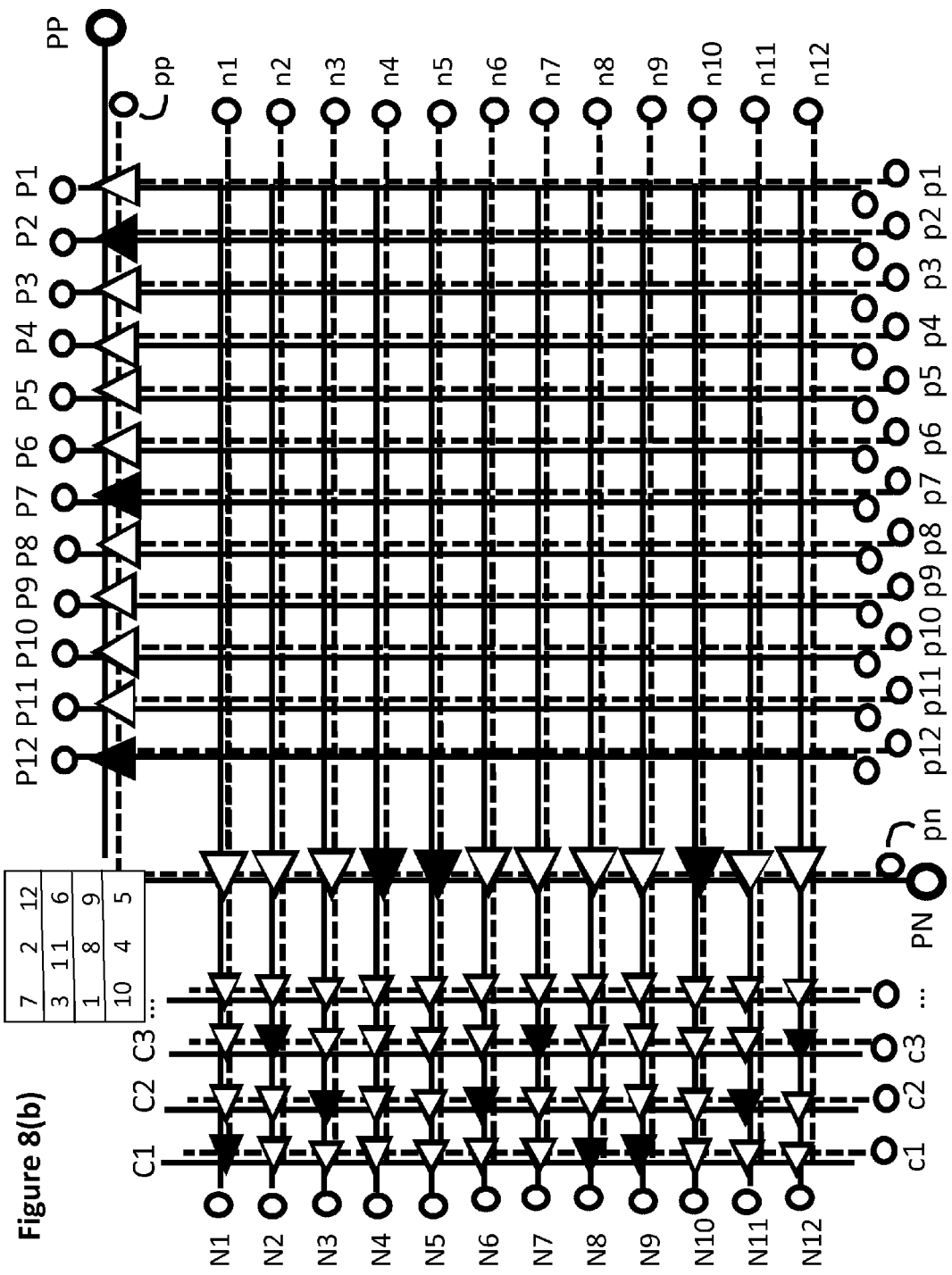
FIG. 8(b)—Third example of achieving parallel connection by separated connection controllers.

The configuration in FIG. 8(a) can be used as combined connection controller, or as a part of separated connection controllers. If FIG. 8(a) is used as a part of separated connection controllers, one may note that, for parallel connection application in FIG. 6, configuration in FIG. 8 (a) or (b) and configuration in FIG. 7 should be used together. If connecting the 3 positive poles of units 3, 11 and 6 (or negative poles of units 7, 2 and 12), and connecting the 3 positive poles of units 1, 8 and 9 (or negative poles of units 3, 11 and 6), and connecting the 3 positive poles of units 10, 4 and 5 (or negative poles of units 1, 8 and 9), then the series connection table shown on top left corner of FIG. 7 is converted into parallel connection table shown on top left corner of FIG. 8(a, or b). Let consider 1$^{st}$ row (i.e. units 7, 2, and 12), they are already connected to units 3, 11, and 6 through series connection part, respectively. Therefore, as shown in FIG. 8(a), connecting negative pole of unit 7 only with positive pole of units 11 and 6 only can achieve the parallel connection for negative pole the 1$^{st}$ row and for positive pole the 2$^{nd}$ rows, all these connections 7-3, 2-3, 2-11, 2-6, 12-3, 12-11, and 12-6 are not necessary, same applied for (2$^{nd}$ and 3$^{rd}$) rows, and so on. One may note that the circuit is still redundant (some switch will not be used). If circuit as shown in FIG. 8(b) is built, the redundancy can be removed. That further means, the circuit configuration in FIG. 8(a) can achieve not only combination "[7 3 1 10], [2 11 8 4], [12 6 9 5]" (series connections within each of the 3 groups) as described in paragraph 5, and can achieve also combination "[7 2 12], [3 11 6], [1 8 9], [10 4 5]" (parallel connections within each of the 4 groups) as described in paragraph 6 along without using FIG. 8 (b), III. Monitoring and Measurement Accessories Using this invented apparatus and method, either each battery subset or each single battery (if subset has only single battery, which means without using battery subset) can be accessed by monitoring instrument and its electrical and electrochemical parameters (such as voltages [open & load], current, resistances [discharge, ohmic←electrolyte & electronic types, non-ohmic or nonlinear, etc.], impedances and impedance spectrum, electric capacity and discharge capacity, SOC[state of capacity], SOH[state of healthy], etc.) can be measured and be monitored as long as the micro-processor selects this subset by using invented connection controller. The monitoring and measuring process can be done every day, or even moment when battery is not at loading or recharging, such as when waiting at red light. Measurement or monitoring is rotated subset by subset or is continued from the measurement for last subset, and result for each subset is stored and updated timely.

As mentioned above, by using invented connection controller, either each battery subset or each single battery (means without using "battery subset") can be accessed by monitoring instrument. However, if selecting the latter, i.e. applying connection controller described above to access EVERY SINGLE battery unit without using "buttery subset", it is very cost and reduces the product competition power (of course, we can build a system in this way if cost is not an issue); while on the other hand, if selecting the former, i.e. applying connection controller described above to access every battery subset, without special treatment, each single battery units inside each battery subset cannot be directly accessed by monitoring instrument. The special treatment described below will solve this problem.

Figure 9A:
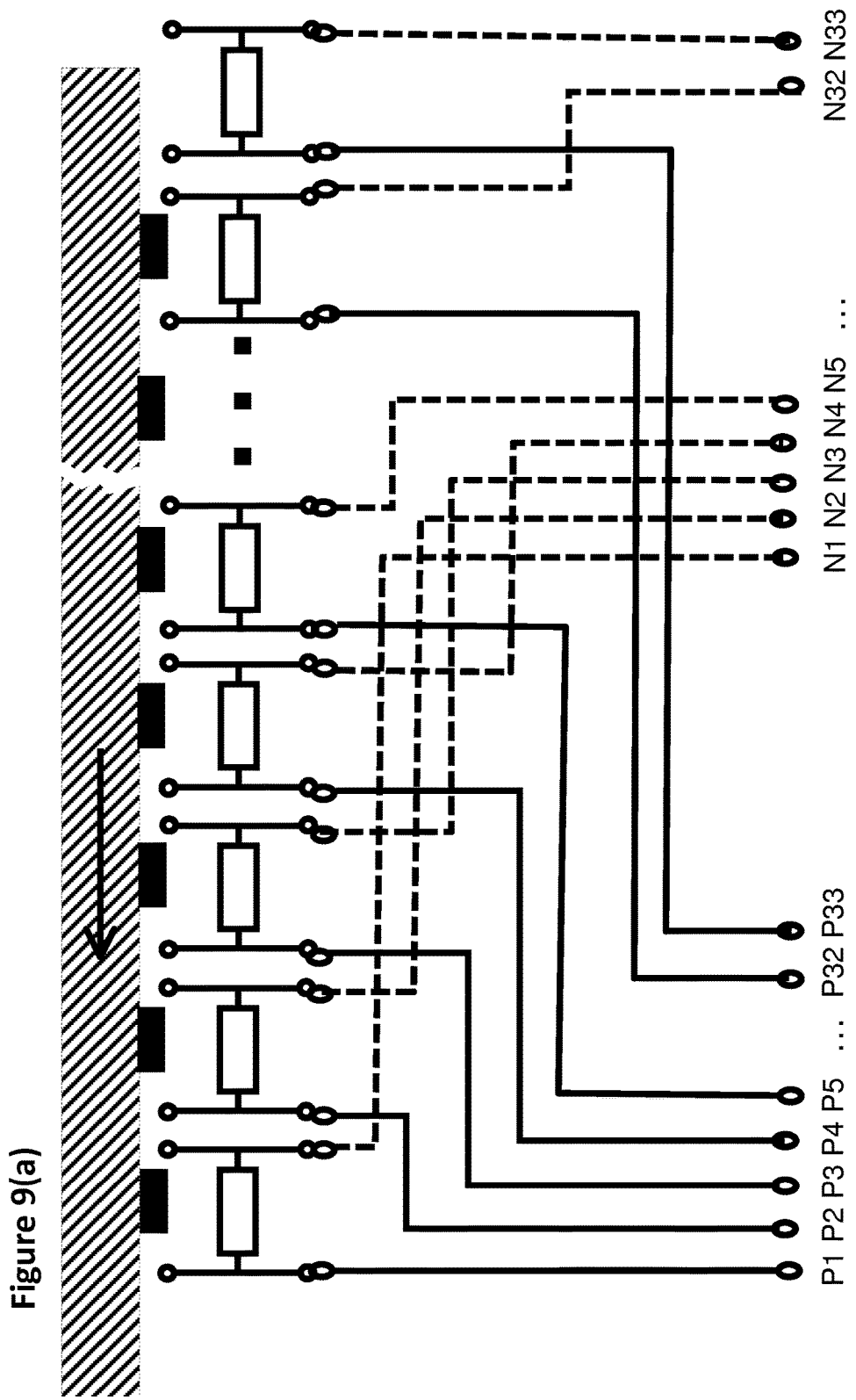
FIG. 9(a)—Example of selection clickers used to switch between "measurement" and "application" (including loading and recharging), for series connection of batteries in battery subset, now it is at "measurement" status.
Figure 9B:
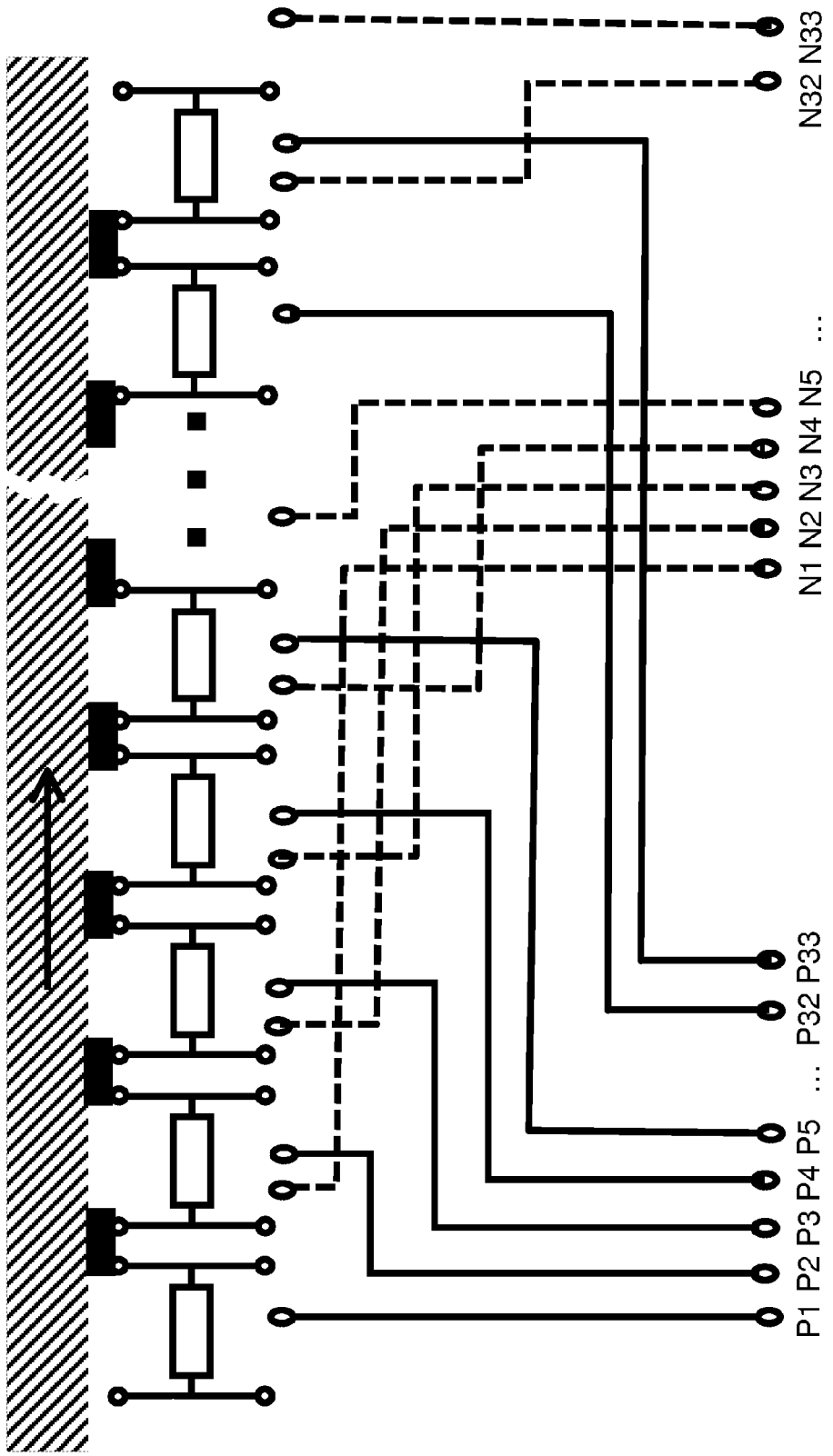
FIG. 9(b)—Example of selection clickers used to switch between "measurement" and "application" (including loading and recharging), for series connection of batteries in battery subset, now it is at "application" status.

FIGS. 9 and 10 show a method (special treatment) to access each single battery and do the measurement for each single battery in a battery subset, using same (i.e. no extra needed) combined connection controller or separated controllers for measurement, loading and recharging, and using a clicker device called selection clicker (either stripe by sliding as show in FIGS. 9 and 10, or short cylinder or circle by rotating [not shown in charts, it can be constructed by connecting the two ends of stripe clickers in FIGS. 9 and 10]) to switch between "measurement" and "application" (including loading and recharging). When switching to "measurement", all terminates of connection controller, i.e. power lines [P1, P2, P3, . . . N1, N2, N3, . . . ] are disconnected from the terminates of all battery subsets, and connected to the all terminates of each single battery in a selected battery subset, meanwhile, the connection (parallel or series) inside the battery subset is decomposed as shown in FIGS. 9 and 10 [from (b) to (a)]; When switching to "application", all terminates of connection controller, i.e. power lines [P1, P2, P3, . . . N1, N2, N3, . . . ,] are connected to the terminates of battery subsets, after disconnected from the all terminates of each single battery in a selected battery subset, meanwhile, the connection (parallel or series) inside the battery subset is re-composed as shown in FIGS. 9 and 10 [from (a) to (b)].

In FIGS. 9(*a*) and (*b*) are shown an example (but not limited to this configuration) of clicker device for the case of series connection inside a battery subset. In FIGS. 10(*a*) and (*b*) are shown an example (hut not limited to this configuration) of clicker device for the case of parallel connection inside a battery subset. In both FIGS. 9 and 10, charts (a) indicate switching to "measurement"; charts (b) indicate switching to "application" (i.e. loading and recharging, for either series or parallel connections). The "measurement" can access each subset in random, or in sequence. If number of power lines in connection controller is greater than the number of batteries in a subset, measurement can be done in one action for all batteries in one battery subset; otherwise, measurement needs multiple actions for one subset. For example, if number of power lines is 12 (as shown in FIG. 3) and number of batteries in a subset is 33 (as shown in FIGS. 9 and 10), then the measurement need 3 actions: first action is to connect and measure battery No. 1 to 12 in the subset, second action is to connect and measure battery No. 13 to 26 in the subset, and the third action is to connect and measure No. 27 to 33 in the subset.

Unlike the monitoring and measuring process for battery subsets, as mentioned before, which can be done every day, or even every moment when battery is not at loading or recharging. For single battery inside a subset, measuring, monitoring, adjustment, and re-combination process can be done every month, or on very weekend. According to measured results, battery in one subset may be made an adjustment or/and re-combination, i.e. exchange location with battery in another subset or with battery within same subset, to get an optimization configuration.

<Recharging and Loading Assignment Optimization>

Using invented embodiments, batteries can be arbitrarily and automatically connected, either in series, or in parallel, and the number battery subsets and number of single batteries in a subset can be arbitrarily assigned. Regarding how to connect, i.e. how many batteries are assigned in a subset and these batteries in a subset are connected in parallel or in series, or in mixed, and how many battery subsets are used in series connection in a column and many parallel columns are assigned, or how many battery subsets are used in parallel connection in a layer and many series layers are assigned, . . . and so on, it is completely determined by modeling analysis and optimization ion of recharging and loading (including the balance elements and motor inductance together), which is based on the measurement or monitoring data of batteries. The detail of modeling analysis and optimization algorithms for recharging and loading varies from case to case of application. The optimization is based on impedance and other parameters, which describe battery's performance, also including motor inductance and balance elements. In the below, only a simple and strait forward example is given to illustrate the basic idea of management, and what optimization of configuration for battery connection means, but actually detail algorithms are much complex than what described in this example from here below.

Assume we have 8000 Li-ion batteries with average open voltage 3.2 Volts, and their intern resistances have a distribution (from larger, median, to smaller). If design motor working at 320 Volts, then we need a connection matrix of battery to achieve this goal and there are many ways of connection to do that, here we show three direct or straight forward ways: the $1^{st}$ way, for each of all possible 8000 ! permutations or combinations (8000 ! is "infinite" because 100 !=$9.33 \times 10^{157}$ is already an astronomy number !, and when calculate 120! by the iPhone calculator, its memory overflows), one can do parallel connection before series connection, which divides 8000 batteries into 100 groups, and connect 80 batteries in parallel (80 columns) in each group, and then connect all 100 groups in series (100 rows); the 2nd way, for each of all possible 8000 ! (infinite) permutations and combinations, one can do series connection before parallel connection, which divides 8000 batteries into 80 groups, and connect 100 batteries in series in each group, then connect all 80 groups in parallel; the $3^{rd}$ way is diving 8000 batteries into 10 (rows)×10 (columns) subset battery matrix, and each battery subset is consist of 10 (rows)×8 (columns) single battery matrix. Actually, the $3^{rd}$ way includes 4 different compositions as shown in the table below:

| Compositions 10 × 10 subsets | Compositions 10 × 8 batteries in each subset |
|---|---|
| parallel connection before series connection | parallel connection before series connection |
| parallel connection before series connection | series connection before parallel connection |
| series connection before parallel connection | parallel connection before series connection |
| series connection before parallel connection | series connection before parallel connection |

Figure 2B:
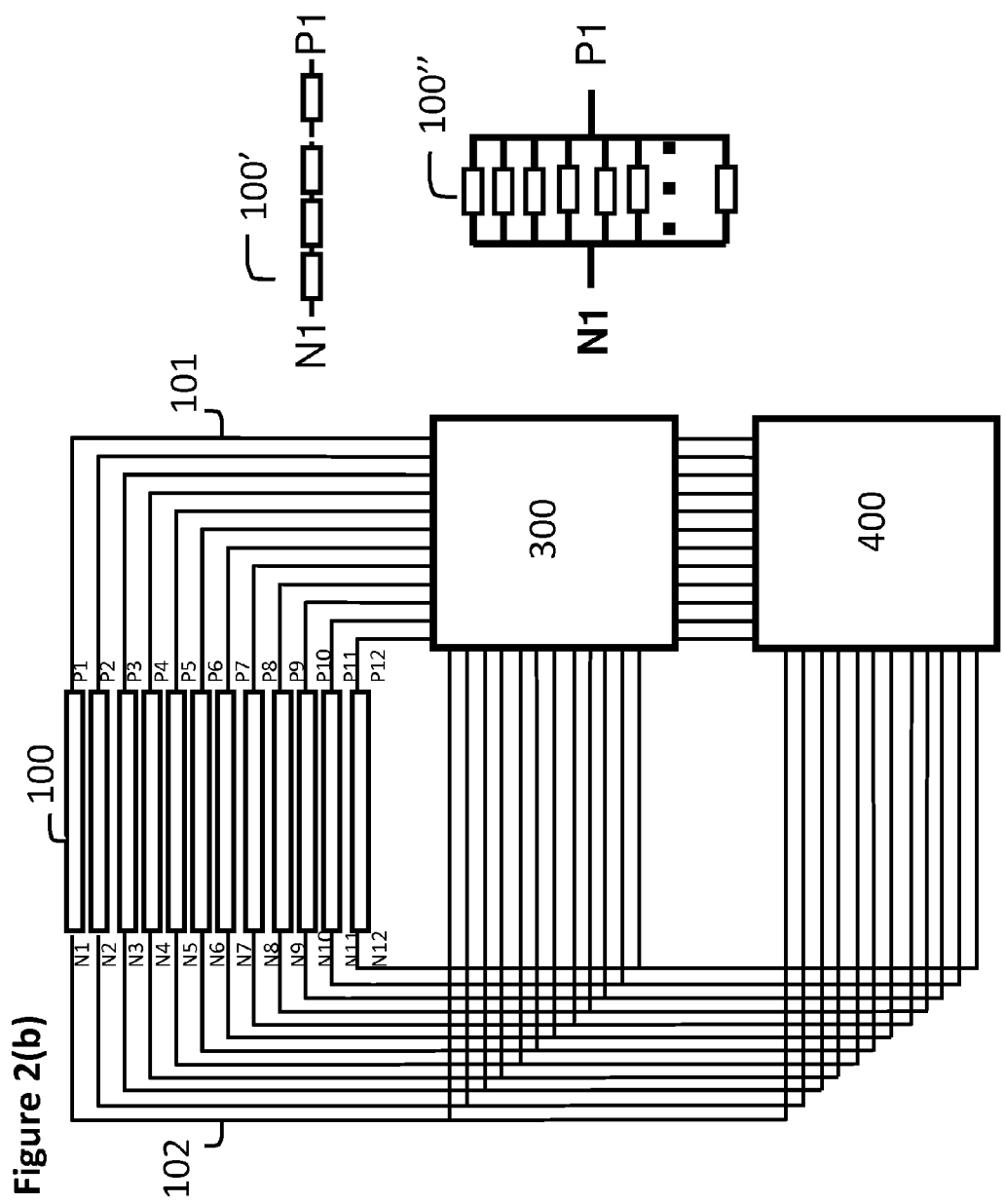
FIG. 2(b)—details of battery connection with two kind of controllers.

Actually, the $3^{rd}$ way can be extended to many ways, i.e. diving 8000 batteries into n1 (rows)×m1 (columns) subset battery matrix, and each battery subset is consist of n2 (rows)×m2 (columns) single battery matrix, with constrains n1×n2=100 and m1×m2=80. The integer solutions of n1×n2=100 are 1×100, 2×50, 4×25, 5×20, 10×10 (total 5 solutions); The integer solutions of m1×m2=80 are 1×80, 2×40, 4×20, 5×16, 8×10 (total 5 solutions), so there are 5×5×4=100 ways extended from the $3^{rd}$ way and these 100 ways can be built at initial of build (static connections inside the each subset), or can be achieved by this invented connection controller (dynamic connections inside the each subset). Further more, the $3^{rd}$ way with its extended 100 ways only include one level battery subset. It can be extended to even more ways by including more levels of battery subset, such as, sub-subset in a subset, and sub-sub-subset in a sub-subset, . . . and so on . . . and there are total a few hundreds ways to connect these 8000 batteries, and for each of these ways, there are 8000! permutations or combinations. This invented connection controller can switch the connections between any two given permutations or combinations from all possible 8000! permutations or combinations. so it can achieve dynamic connections arbitrarily for all batteries or battery subsets during operation—this is what we mean "arbitrary connection of battery subsets" or "arbitrarily connecting battery subsets automatically". One can see that the battery management units of Kawahara et al (US 2011/0313613), Poehler et al (WO 2013143754), Gorbold (U.S. Pat. No. 7,859,223 B2) and all other cited inventors cannot achieve such "arbitrary and automatic connection" dynamically during operation. The detail differences of this invention from the prior arts are compared in comparison table in "Background of Invention". For example, both Kawahara and Gorbold were using daisy chain connection, and all of these connections are fixed at initial of manufacture even through their connection can be in parallel or in series, or may be changed manually when battery maintain but cannot be changed or recombined automatically during operation, which means: (1) each battery or battery subset needs management units (such as the two units in Kawahara's FIG. 2, and management unit is usually a balance or equalization circuit or by pass etc.); (2) each single battery cannot be automatically selected for testing, charging and recharging, (3) the number of batteries or battery sets is limited (up to 200 in Kawahara's invention, but it is hard to do with over thousand), and (4) circuit for management and circuit for monitoring are separate circuits. In contract with connection controller of this invention, (1) balance and equalization circuits as management unit are not needed, but only need connection controller with a computer or microprocessor for overall management and switching control to re-connect or re-composite batteries or battery subsets; (2) each single battery or battery subset can be automatically selectable or accessible for testing, charging and recharging for optimizing battery composition and re-connect batteries or battery subsets automatically at any time during operation according to the monitoring results; (3) no limitation for the number of batteries or battery sets for static connection and dynamical connection as long as there is no other physics limitations; (4) cell selection in the management of charging and recharging. and management of monitoring are completed by same circuit which is connection controller.

As we already seen above, extended from the $3^{rd}$ ways above, there are total a few hundreds ways to connect these 8000 batteries, the optimization means finding out the best way for the application from these hundreds composition ways (circuits), and within the best way (circuit), finding out best combination (i.e. the best permutation or combination for cell matching) for all individual battery cells. Therefore optimization needs help from programming or modeling and it is complex to describe through language without math and equations, but it can be easily understand by a person skilled in the art. However, optimization idea can described through a simple example applied on the $1^{st}$ way and the $2^{nd}$ way.

Let's talk about the $2^{nd}$ way first in the below, because it is straightforward. As we know that, open circuit voltage of battery is a nonlinear, but monotonic function of SOC. So if open-circuit voltages are matched, the subsets or batteries will have equal SOC. Under loading, terminal voltage will vary significantly from open-circuit voltage due to internal impedance of battery or subset, which is again a nonlinear function of SOC. If all of the batteries in a column are properly managed through re-combination (i.e. a permutation or combination) by connection controller of this invention, their internal impedances should be nearly equal. We can simply group batteries by impedance, so that, within each column, every batteries have almost same internal impedance, but different column has different total internal impedance, then when re-charging voltage is applied, the voltages divided onto each battery in a column are almost same, but different column is assigned different current according to different total impedance—the column with smaller impedance (corresponding higher SOC) passes more current and so gets more charged energy—which is consistent with higher capacity even if without help from balance elements (or circuits) and equalization, so all columns can reach their maximum charging at almost same time. Without invented connection controller and above procedure, once any one bad battery in the matrix reach it's maximum charging, the charging process must stop for all battery, even if most of the batteries are tar away from completely charged, in this case, balance elements and equalization is a must, but cost is much higher. When discharging with load, the batteries need to be re-connected, so that, within each column, the every batteries have closest SOC (not necessary completely consistence with impedance due to battery intrinsic complexity), but different column has different total SOC, the SOC's of some of them are larger, but some are smaller. Considering battery prefers working at smaller current (longer life time), the invented management system will use all batteries, i.e. all columns, when automobile is speeding up [need more power], or climbing up steep hills, so that each battery works at smallest current. However, when automobile is driving on flat road, or at low speed, management system will not use all battery columns, again, considering battery prefers working at smaller current, the management system only excludes only one, or two, or a few (but "one" may be the best) battery column with lowest SOC from loading, i.e. the management system always picks out the column with lowest SOC, and exclude it from the loading at low power consuming state. May be 5 minute later, this one is longer the one with lowest SOC, the system will pick out a new one with lowest SOC for instead. In this way, the stored energy of all batteries can be almost completely used before next re-charging. In the example of 8000 battery cells mentioned above, there are 100 rows and 80 columns. After exclude the 1 column with lowest SOC, there are 79 columns left for loading, so we could use either the $1^{st}$ way (parallel connection before series connection) or the $2^{nd}$ way (series connection before parallel connection) to composite the 100 rows×79 columns battery matrix.

The way functions almost same as the $2^{nd}$ way except it has local self-compensation within each row through parallel connections of every internal layer. While, the $2^{nd}$ way does not have because the parallel connections are only at the two outside terminals (no internal parallel connections). As mentioned above, we can group batteries with closest internal impedance or closest SOC in same column, bases on this assignation, we could further assign the batteries for each rows so that all the rows have closest total impedance $1/[1/Zk1+1/Zk2+1/Zk3+ \ldots +1/Zk79]$ (still using the 8000 cells example above, where k=1, 2, 3, . . . , 100). Whatever in re-charging or discharging, within a row, a cell with smaller impedance (larger SOC) will pass more current, while a cell with larger impedance (smaller SOC) will pass less current, which is equivalent to a local current cycle (around average) from larger SOC cell to small SCO cell, canceling the latter current (re-charging) and enhancing the former current—this is so called local self-compensation.

<Thermal System and its Management>

"Hole-net thermal bed" is a preferred embodiment for thermal management. The individual cells within a battery set differ due to manufacturing variations, temperature gradients, and aging effects (also temperature dependent). Therefore, batteries or battery subsets need to be installed or mounted in a thermal bed, which is an integrated matrix of mounting beds of batteries and is made up of good thermal conduct material, such as copper, Aluminum, etc. Inside the walls of battery thermal bed, there is hole-net (i.e. many fluid flow such as air or water flow channels) which is connected to thermal controlling system, the fluid such as air with almost same temperature is conducted to thermal beds of all batteries through the hole-net, so that all of the battery have almost same temperature as the battery bed, which eliminates the temperature gradients (cell to cell and inside every cell) at the best situation, as a result, only one (at center) or two (one at center, one at outside) temperature sensor(s) are needed (multiple sensors for different management units as mentioned in Kawahara's are not necessary). When starting use of battery at cold weather, the heating system heats the all batteries to right temperature until batteries are self-warming up due to current going through. If the battery is too hot due the hot weather or due too heavy load, the cooling system starts working, bring cold air into hole-net to cool down the battery.

What is claimed is:

1. A method of intelligently managing battery set comprising:
   a connection controller comprising a switch matrix circuit, wherein, said connection controller is for connecting battery subsets of a battery set in desired connection including parallel, series and mixed, and is functional switchable, and has a row of negative power terminates and a row of positive power terminates which are connected with corresponding negative and positive poles of battery subsets, respectively;
   a selection clicker for accessing each single individual battery in each of battery subsets;
   a hole-net thermal bed for mounting batteries and reducing temperature gradients of battery set;
   a management system using said connection controller, said selection clicker, and said hole-net thermal bed, and further comprising monitoring meters, a battery charger, a load serve pack, and a controller;
   wherein, said controller is a programmable device including a micro-processor, said controller performs the steps of:
      managing the connection status of the switch matrix circuit as it switches among tasks, including a monitoring task, a loading task through discharging, and a recharging task; and a recharging task;
      managing connection status of all switches in said switch matrix of said connection controller, and automatically connect battery subsets in a desired connections;
      managing thermal control according to thermal monitoring data,
   determining the desired task and managing the connection controller to configure the switch matrix to achieve a one of a monitoring task, loading task through discharging, and recharging task;
   managing said connection controller to connect said battery subset to the monitoring meter during said monitoring task;
   receiving monitoring data during the monitoring task, and managing the connection controller to configure the switch matrix to change from the monitoring task to the recharging task based on analyzing the monitoring data, when the recharging task is activated, optimizing the composition and connection of battery subsets by a specified operation procedures;
   intermittently switching between the charging task and the monitoring task, during the charging task, to check status of capacity of battery subsets, and when the battery sets are full charged, then managing the connection controller to configure the switch matrix to the loading task through discharging;
   receiving monitoring data during the monitoring task, and managing the connection controller to configure the switch matrix to change from the monitoring task to the loading task through discharging based on analyzing the monitoring data, when the loading task through discharging is activated, optimizing the composition and connection of battery subsets by a specified operation procedures;
   intermittently switching between the loading task through discharging and the monitoring task, during the loading task through discharging to check status of capacity of battery subsets, and when the capacity of battery sets are dropped below a predetermined threshold, managing the connection controller to configure the switch matrix to the recharging task;
   controlling the selection clicker of the connection controller to switch between negative and positive poles of battery subsets during the monitoring task, loading task through discharging, and recharging task;
   controlling the selection clicker of the connection controller to switch between negative and positive poles of batteries in a selected battery subset when monitoring an individual battery in a selected battery subset; and
   controlling the temperature of battery set in an uniform environment through fluid flows in channels of said hole-net thermal bed.

2. The method of claim 1, wherein said connection controller with automatically switches between the connecting battery subsets by parallel, series or mixed connections; which is in operative connection with negative power lines which is in connection to all negative poles of battery subsets; (2) positive power lines to all positive poles of battery subsets; (3) one negative power line with the whole battery set; (4) connecting one positive power line with the whole battery set; (5) a matrix of switches at matrix of cross nodes of all said negative power lines and all said positive power lines; and (6) lower-voltage switch control lines and higher-voltage switch control lines respectively; wherein, two of four terminals of each of the switches in said connection controller are connected to a negative power line and a positive power lines at the corresponding node; wherein, two of four terminates of each of the switches in said connection controller are connected to lower-voltage switch control line and higher-voltage switch control line at node; wherein, the switch opens or closes and determines the disconnection or connection of two crossed power lines, while the voltage difference of two crossed switch control lines determines the status of switch; and wherein, the voltage difference is controlled by said controller.

3. The method of claim 1, wherein said controller optimizes the charging and loading performance comprise the steps of: (1) maximizing the power requirement by determining the total number of batteries (Nb) in the battery set; (2) determining the matrix dimension of connection (Nm); determining the total number Ns of batteries in a battery subset; wherein, (Nm×Ns)>Nb; wherein, for small number Nb, Ns is set as 1 and Nm>Nb; (3) setting the total voltage requirement; said controller further determining the total number of rows (Nr) for batteries in series connection, and then the total number of columns (Nc) for batteries in parallel connection; (4) said controller signaling the switcher to connect monitoring meters with said connection controller and sending a command for measuring battery electrical and electrochemical parameters, and receiving and storing measured data, by using said controller and said signaling said selection clicker to access each single battery in a selected battery subset or to access each battery subset in said battery set; (5) said controller sending and receiving a thermal control command for measuring the temperature, thermal condition data receiving and storing, and for heating and cooling battery subsystems; (6) said system controller optimizing connections by comparing modeling analysis with operating conditions for best connections for recharging of battery subsets according to measured parameters of batteries and thermal conditions, followed by sending task switching commands to said selection clicker to complete rotation of the position rotator when needed to switch between monitoring all battery subsets in battery set and monitoring all single batteries in a selected battery subset.

\* \* \* \* \*